United States Patent [19]

Chao et al.

[11] Patent Number: 5,050,164
[45] Date of Patent: Sep. 17, 1991

[54] OPTICAL CUSTOMER PREMISES NETWORK

[75] Inventors: Hung-Hsiang J. Chao, Lincroft; Gennady Shtirmer, Morris Plains; Lanny S. Smoot, Morris Township, Morris County, all of N.J.

[73] Assignee: Bell Communications Research, Inc., Livingston, N.J.

[21] Appl. No.: 429,845

[22] Filed: Oct. 31, 1989

[51] Int. Cl.⁵ ............................................. H04J 14/00
[52] U.S. Cl. .............................. 359/135; 370/85.12; 359/124
[58] Field of Search ................. 370/85.9, 85.11, 85.12, 370/1, 4, 3, 85.13, 85.14, 124, 75, 30; 455/607

[56] References Cited

U.S. PATENT DOCUMENTS

| | | | |
|---|---|---|---|
| 4,406,513 | 9/1983 | Raphael | 350/96.16 |
| 4,587,651 | 5/1986 | Nelson et al. | 370/85.12 |
| 4,670,873 | 6/1987 | Cour et al. | 370/85.12 |
| 4,707,830 | 11/1987 | Ulug | 370/85.9 |
| 4,719,622 | 1/1988 | Whipple et al. | 370/110.1 |
| 4,757,497 | 7/1988 | Bierle et al. | 370/85.12 |
| 4,819,226 | 4/1989 | Beckner et al. | 370/55 |
| 4,837,856 | 6/1989 | Glista, Jr. | 370/85.12 |
| 4,850,047 | 7/1989 | Iguchi et al. | 370/4 |

OTHER PUBLICATIONS

"A Wide-Band Local Access System Using Emerging-Technology Components", L. R. Linnell, IEEE Journal on Selected Areas in Communications, vol. 4, No. 4, pp. 612-618, Jul. 1986.
"Broadband ISDN Switching Capabilities from a Services Perspective", D. R. Spears, IEEE Journal on Selected Areas in Communications, vol. 5, No. 8, pp. 1222-1230, Oct. 1987.
"Design of Transmission and Multiplexing Systems for Broadband Packet Networks", H. J. Chao, IEEE Journal on Selected Areas in Communications, vol. 6, No. 9, pp. 1511-1520, Dec. 1988.
"Application of Self-Routing Switches to LATA Fiber Optic Networks", C. Day, et al., International Switching Symposium, Phoenix, AZ, Mar. 1987.
"Nonblocking Copy Networks for Multicast Packet Switching", T. T. Lee, IEEE Journal on Selected Areas in Communications, vol. 6, No. 9, pp. 1455-1467, Dec. 1988.
"Resource Allocation for Broadband Network", J. Y. Hui, IEEE Journal on Selected Areas in Communications, vol. 6, No. 9, pp. 1598-1608, Dec. 1988.
"The Emerging FDDI Standard", J. F. McCool, Telecommunications, pp. 50-58, May 1987.
"Description of Fasnet—A Unidirectional Local—Area Communications Network", J. O. Limb et al., BSTJ, vol. 61, No. 7, pp. 1413-1440, Sep. 1982.
"Bellcore METROCORE ᵀᴹ Network—A Test-Bed for Metropolitan Area Network Research", A. Albanese et al., Globecom 1988, pp. 38.1.1-38.1.6. METROCORE is a Trademark of Bellcore.
"The QPSX Man", R. M. Newman et al., IEEE Comm. Mag., vol. 26, No. 4, pp. 20-28, Apr. 1988.

Primary Examiner—Douglas W. Olms
Assistant Examiner—Melvin Marcelo
Attorney, Agent, or Firm—James W. Falk; Leonard C. Suchyta

[57] ABSTRACT

A customer premises network for interfacing customer premises equipment with a broadband digital trunk and exchange network comprises a relatively large bandwidth optical broadcast bus for broadcasting downstream data to the customer premises equipment and a smaller bandwidth looped bus for transmitting upstream data from the customer premises equipment. The units of customer premises equipment are connected by the looped bus in a daisy chain.

11 Claims, 9 Drawing Sheets

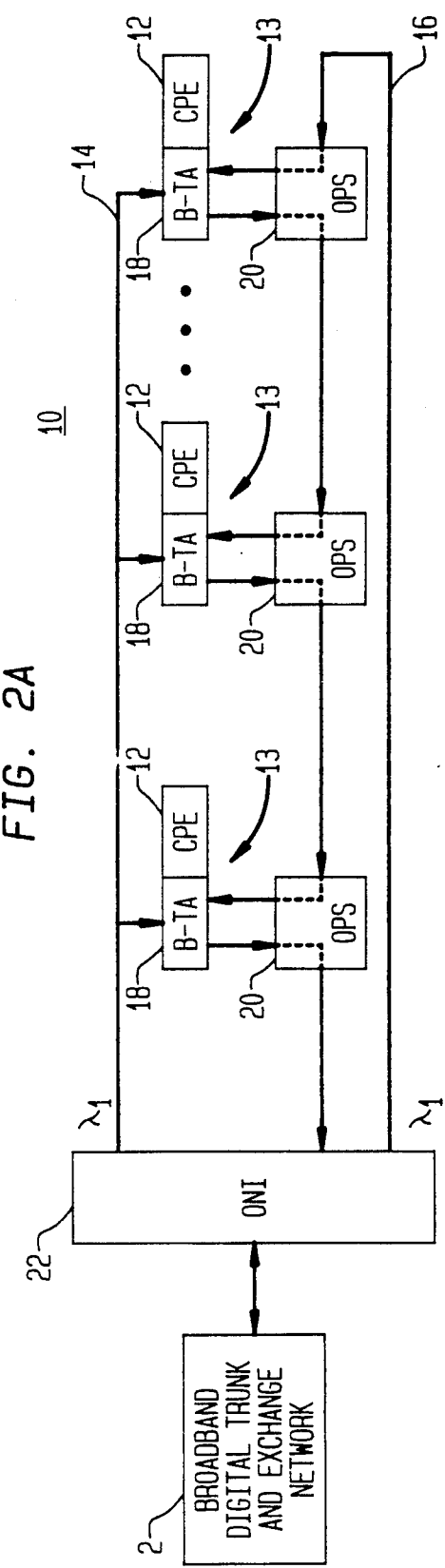
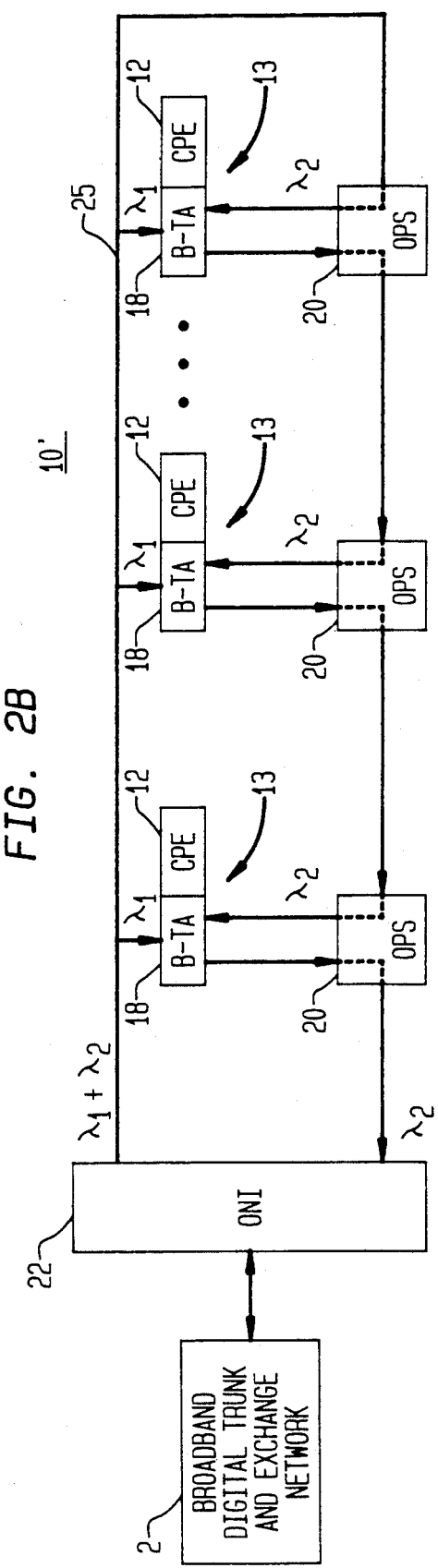
FIG. 2A
FIG. 2B

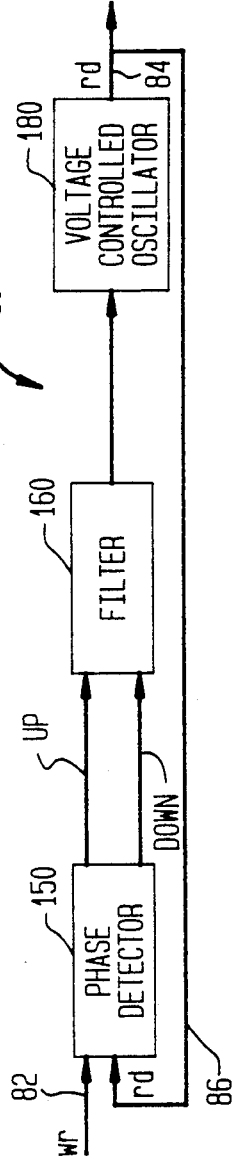
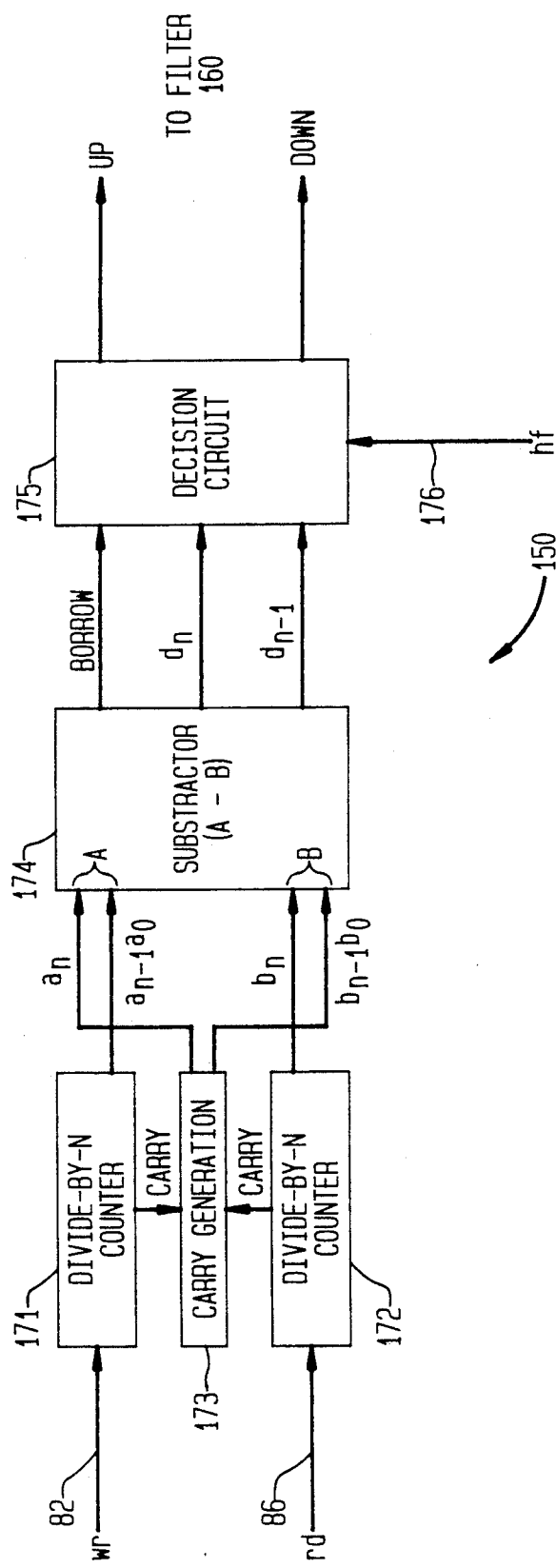
FIG. 7A
FIG. 7B

OPTICAL CUSTOMER PREMISES NETWORK

RELATED APPLICATION

A patent application entitled "Service Clock Recovery Circuit", Ser. No. 07/429,840, has been filed on even date herewith for H-H J. Chao and C. A. Johnston and is assigned to the assignee hereof. This application contains subject matter related to the subject matter of the present application.

FIELD OF THE INVENTION

The present invention relates to an optical customer premises network. The inventive customer premises network receives ISDN signals transmitted via an ISDN trunk and exchange network and distributes these signals to customer premises equipment connected to the customer premises network. The customer premises network makes use of a hybrid architecture wherein an optical fiber broadcast bus transmits downstream signals to the customer premises equipment and a looped optical fiber bus is used for upstream traffic. The customer premises network of the present invention provides a mechanism whereby the benefits of wideband optical fiber based telecommunications can be introduced into individual homes and offices.

BACKGROUND OF THE INVENTION

The demand for various wideband telecommunications services such as high resolution video, voice communications, and terminal and computer connections provides an impetus for the introduction of a broadband digital trunk and exchange network. One example of a broadband digital trunk and exchange network is known as the Broadband Integrated Digital Services Network (B-ISDN) (see e.g. L. R. Linnell, "A Wide-Band Local Access System Using Emerging-Technology Components," IEEE Journal on Selected Areas in Communications, vol. 4, no. 4, pp. 612-618, July 1986; D. R. Spears, "Broadband ISDN Switching Capabilities F. from a Services Perspective," IEEE Journal on Selected Areas in Communications, vol. 5, no. 8, pp. 1222-1230, October 1987).

Information transmitted across a broadband digital trunk and exchange network such as BISDN may be carried using the Asynchronous Transfer Mode (ATM) technique (see e.g. S. E. Minzer, "Toward an International Broadband ISDN Standard" Telecommunications, October, 1987 and Chao et al, "Dynamic Time Division Multiplexing," U.S. patent application Ser. No. 118,977 filed on Nov. 10, 1987, now U.S. Pat. No. 4,893,306 issued Jan. 9, 1990 and assigned to the assignee hereof). In the ATM technique, data from various services are transmitted in fixed length cells, which cells are embedded in the payload envelopes of the frames which comprise the Synchronous Optical Network (SONET) STS-3c or STS-12c signals (see e.g. Draft of American National Standard For Telecommunications Digital Hierarchy Optical Interface Rates and Formats Specifications, T1X1.4/87-505R4, December 1987).

Many network issues such as packet transmission and multiplexing techniques (see e.g., H. J. Chao, "Design of Transmission and Multiplexing Systems For Broadband Packet Networks," IEEE Journal on Selected Areas in Communications, vol. 6, no. 9, pp. 1511-1520, December 1988), packet switching network designs (see e.g. C. Day, J. Giacopelli, and J. Hickey, "Application of Self-Routing Switches to LATA Fiber Optic Networks," in Proc. 1987 International Switching Symposium, Phoenix, Ariz., March 1987; T. T. Lee, "Nonblocking Copy Networks for Multicast Packet Switching," IEEE Journal on Selected Areas in Communications, vol. 6, no. 9, pp. 1455-1467, December 1988), and routing and flow control (see e.g. J. Y. Hui, "Resource Allocation for Broadband Network," IEEE Journal on Selected Areas in Communications, vol. 6, no. 9, pp. 1598-1608, December 1988) have been widely explored for broadband digital trunk and exchange networks such as B-ISDN.

Here, the concern is with the customer premises network. The customer premises network provides interface connections between a public broadband digital trunk and exchange network and the customer premises equipment or user terminals. The customer premises equipment includes devices such as telephones, fax machines, video display devices, and various types of computer terminals and workstations.

A customer premises network for use in connection with a broadband digital trunk and exchange network desirably has the following characteristics.

1. Multiple Priorities

Due to the different delay constraints for various services (e.g., video, voice, data), the access of the various services to the limited bandwidth in the customer premises network should be prioritized. For example, real time traffic such as video and voice are more delay-sensitive than data and should be assigned higher priority.

2. Uniform Access

The customer premises network should support a wide variety of services and all of the services should be carried using a single transfer technique such as ATM.

3. Asymmetric Traffic

Traffic in the customer premises network flows mostly between the external public trunk and exchange network and the customer premises equipment attached to the customer premises network. In particular, in residential applications, the amount of downstream traffic transmitted to the customer premises equipment via the customer premises network will greatly exceed the upstream traffic generated by the customer premises equipment. For example, the demand for multiple channel high quality residential video such as HDTV requires a transmission bandwidth of about 600 Mbits/sec in the downstream direction while a transmission bandwidth of about 150 Mbits/sec is required in the upstream direction.

4. Centralized Control Capability

An interface serving as a gateway between the public trunk and exchange network and the customer premises network is desirable for providing centralized control functions such as call setup, administration, maintenance, and flow control.

5. Flexibility

The customer premises network should be designed to accommodate changes such as the addition or relocation of particular units of customer premises equipment, which commonly occur in the customer premises environment.

6. Reliability

The design of the customer premises network should be sufficiently reliable to prevent an entire network from failure due to a malfunction in a single unit of customer premises equipment.

7. Economy

The customer premises network should be cost effective. Several architectures and associated access protocols have been proposed for the customer premises network. These include a token ring architecture using the FDDI protocol (see e.g. J. F. McCool, "The Emerging FDDI Standards," Telecommunications, May 1987), the METROCORE double unidirectional bus architecture and associated Fasnet protocol (see e.g. J. O. Limb and C. Flores, "Description of Fasnet—A Unidirectional Local Area Communications Network," BSTJ, vol. 61, no. 7, pp. 1413, September, 1982; A. Albanese et al, "Bellcore METROCORE Network—A Test-Bed For Metropolitan Area Network Research," Globecom queuing dual bus architecture and its associated QPSX protocol (see e.g. R. M. Newman, Z. L. Budrikis, and J. H. Hullett, "The QPSX MAN," IEEE Communication Magazine, vol. 26, no. 4, pp. 20–28, April 1988).

However, none of these prior art customer premises networks meet the desired characteristics for such networks as set forth above. For example, the FDDI token ring system mentioned above does not provide uniform access for all types of services. The METROCORE system and associated Fasnet protocol are highly inefficient because of the dead time between service cycles. This inefficiency is increased, when under uniform access conditions, high bit rate services such as full motion variable bit rate video are accommodated. In embodiments where the dead time is eliminated, this system is not able to provide uniform access for all services. The distributed queuing dual bus system mentioned above is highly complex in that each unit of customer premises equipment must be aware of the position of a desired destination unit of customer premises equipment in order to decide on which bus to send information. Thus, flexibility is hard to achieve in this architecture. In addition, different transfer techniques are used for different types of services, so that each unit of customer premises equipment is required to have hardware for more than one type of transfer technique.

In view of the foregoing, it is an object of the present invention to provide a customer premises network which meets the desired characteristics for customer premises networks set forth above. It is a further object of the invention to provide a customer premises network which utilizes ATM to deliver all services.

SUMMARY OF THE INVENTION

The customer premises network of the present invention comprises two unidirectional optical fiber buses operating at different bit rates. Each user terminal or unit of customer premises equipment interfaces with the two buses by way of a broadband terminal adapter. A unit of customer premises equipment and its associated broadband terminal adapter form a node of the customer premises network.

The two buses are connected at an optical network interface which serves as a gateway between a broadband trunk and exchange network such as B-ISDN and the customer premises network. The optical network interface also provides access to centralized control functions such as call setup, network maintenance, and administration.

Of the two buses, a first bus is a broadcast bus which transmits downstream signals to the customer premises equipment. Illustratively, this broadcast bus has a bit rate on the order of 600 Mbits/sec. The terminal adapter associated with each specific unit of customer premises equipment filters out the information destined to the specific unit of customer premises equipment from the broadcast bit stream. Since each unit of customer premises equipment receives information only from the optical network interface, there is no phase alignment problem.

The second bus, which transmits upstream signals from the customer premises equipment, is arranged in a loop starting and ending at the optical network interface. Typically, the second bus has a capacity of about 150 Mbits/sec. The nodes (i.e. the units of customer premises equipment and their associated terminal adapters) are connected sequentially to the upstream bus in a daisy chain fashion.

To utilize the ATM transmission technique, the optical network interface generate a series of empty cells on the looped bus to pick up information at the nodes according to a protocol to be described below. The cells move from node to node on the looped bus so that the nodes can fill arriving empty cells with data to be transmitted. Intra-customer premises network transmissions between units of customer premises equipment is provided via the optical network interface using the looped bus.

In short, the inventive customer premises network may be described as providing a broadcast mechanism for downstream transmissions to the customer premises equipment and a daisy chain access mechanism for upstream communications from the customer premises equipment. The inventive customer premises network meets all the desired criteria mentioned above for customer premises equipment and, in particular, provides uniform access by all services to the customer premises equipment using the above-mentioned ATM transmission technique.

BRIEF DESCRIPTION OF THE DRAWING

FIG. 2a schematically illustrates a customer premises network in accordance with an illustrative embodiment of the present invention.

FIG. 2b schematically illustrates an alternative customer premises network in accordance with an alternative illustrative embodiment of the present invention.

FIG. 4 schematically illustrates an optical network interface for use in connection with the customer premises network of FIG. 2a.

FIG. 5 schematically illustrates a broadband terminal adapter for use in connection with the customer premises network of FIG. 2a.

FIG. 6 schematically illustrates an optical protection switch for use in connection with the customer premises network of FIG. 2a.

FIGS. 7a, 7b, 7c, illustrate a service clock recovery circuit for use in connection with the terminal adapter of FIG. 5.

DETAILED DESCRIPTION OF THE INVENTION

The detailed description of the inventive customer premises network is divided into the following subsections.

A. Overview of the Customer Premises Network
B. Optical Network Interface
C. Broadband Terminal Adapter
D. Optical Protection Switch
E. Service Clock Recovery Circuit
F. Access Protocol for the Customer Premises Network

A. Overview of the Customer Premises Network

Figure 1:
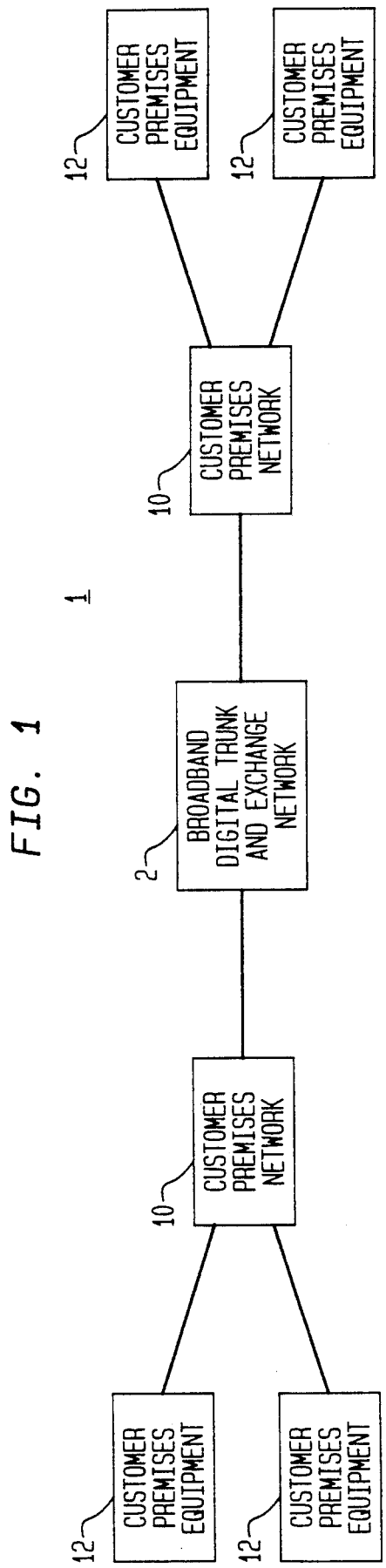
FIG. 1 schematically illustrates a broadband digital telecommunications network.

In FIG. 1, a broadband telecommunications network 1 is schematically illustrated. One purpose of the telecommunications network 1 is to setup end-to-end connections between the various user terminals or customer premises equipment units 12. The network 1 comprises a public broadband digital trunk and exchange network 2, which illustratively is a B-ISDN, and the optical customer premises networks 10. The customer premises networks 10 serve to interface the customer premises equipment 12 with the broadband trunk and exchange network 2. As such, the customer premises networks 10 provide a mechanism for introducing optical fiber communications into individual homes and business offices.

FIG. 2a schematically illustrates an optical customer premises network 10. The network 10 of FIG. 2a comprises two buses 14 and 16. The buses 14 and 16 are optical buses which are implemented using optical fibers. Each unit of customer premises equipment (CPE) 12 interfaces with the bus 14 using a broadband terminal adapter unit 18 (designated B-TA in FIG. 2a). Each unit of customer premises equipment 12 and associated broadband terminal adapter 18 form a node 13 of the customer premises network 10. The broadband terminal adapter 18 is described in detail in section C below.

Similarly, each unit of customer premises equipment 12 interfaces with the bus 16 by way of its associated broadband terminal adapter 18 and an optical protection switch 20 (designated OPS in FIG. 2a). The optical protection switch 20 is described below in detail in Section D below.

Both buses 14 and 16 are connected to an optical network interface (ONI) 22, which optical network interface is in turn connected to the broadband trunk and exchange network 2. The optical network interface 22 serves as a gateway between the trunk and exchange network 2 and the customer premises network 10. The optical network interface 22 also provides access to certain centralized control functions associated with call setup, network maintenance, and administration. The optical network interface 22 is described in detail in Section B below.

The bus 14 serves to broadcast downstream signals from the optical network interface 22 to the units of customer premises equipment 12. Each broadband terminal adapter 18 filters out from the broadcast bit stream only that information destined for its associated unit of customer premises equipment 12. Since each unit of customer premises equipment 12 only receives information from the optical network interface 22, there is no phase alignment problem. Illustratively, the bandwidth of the bus 14 is on the order of 600 Mbit/sec.

It should be noted that the high bit rate downstream optical signals are passively tapped at each broadband terminal adapter 18 and filtered electronically. There is no need to regenerate the downstream signal at each broadband terminal adapter 18.

The bus 16 serves to transmit upstream signals from the customer premises equipment 12 to the optical network interface 22. The bus 16 is in the form of a loop which starts and ends at the optical network interface 22. The looped bus 16 interconnects all of the broadband terminal adapters 18 in a daisy chain manner. To use the Asynchronous Transfer Mode, the optical network interface 22 transmits a train of empty cells onto the looped bus 16. This train of cells is passed from one broadband terminal adapter 18 to the next along the looped bus 16 to pick up data from the associated customer premises equipment units 12, the train of cells being regenerated at each broadband terminal adapter 18. Communications between the units of customer premises 12 is provided by the bus 16 and the bus 14 via the optical network interface 22. The looped bus 16 has a bandwidth on the order of 150 Megabits/sec.

Because the nodes 13 (i.e. the broadband terminal adapters 18 and associated units of customer premises equipment 12) are connected via the bus 16 in a daisy chain fashion, the bus 16 is in general vulnerable to the failure of one of the nodes 13. For this reason, the optical protection switches 20 are utilized to improve the reliability of the network 10. Thus in the event of a failure of a node 13 due to electronic problems, power loss, or disconnection, the associated optical protection switch 20 will bypass the failed node, thus preserving the optical continuity of the bus 16.

On the downstream broadcast bus 14 either uniform taps (in which some fixed fraction of the optical power is tapped from the bus at each node 13) or nonuniform taps (in which the coupling ratio of each node 13 is adjusted to tap off equal received power at each node) can be used to receive optical signals. The latter allows more nodes to be attached to the broadcast bus 14. However, in practice, it would be unattractive to use unique taps for each position on the bus 14, since utilizing a large number of tap types and ensuring that they are placed in the correct order on the bus would increase installation costs. Illustratively, the maximum number of uniform taps on the broadcast bus 14 is 23 or 39 for the case of $P_T/P_{min} = 30$ db or 40 dB, respectively, where PT is the optical power transmitted from Optical Network Interface 22 and Pmin is minimum optical power required at each node for the performance to be acceptable. These numbers are obtained based on the assumption that total insertion loss between nodes is 0.5 dB including 0.20 dB coupler excess loss, 0.25 dB splice-connection loss and 0.05 dB fiber loss. If more nodes are required on the downstream bus, the downstream optical signal must be regenerated after some number of taps, before the signal power falls below the acceptable level determined by the type of optical receivers employed in the customer premises network 13. For the downstream signal, a laser-based transmitter (not shown) can be utilized in the optical network interface 22 to achieve a 30-40 dB gain. On the other hand, an LED-based transmitter (not shown) in each node 13 will generate enough optical power for the upstream signal since the upstream signals are terminated and regenerated at each node 13.

It should be noted that in the network 10 of FIG. 2a, the same wavelength $\lambda_1$ can be used to carry the downstream signal on the bus 14 and the upstream signal on the bus 16 because the two buses are formed from physically distinct optical fiber structures. An alternative embodiment of the customer premises network is illustrated in FIG. 2b. Like elements in FIGS. 2a and 2b have the same identifying numerals. In the network 10' of FIG. 2b, a single bus structure 25 is utilized. The downstream signal is broadcast to all of the broadband terminal adapters 18 via the bus structure 25 using a first wavelength $\lambda_1$, while a second wavelength $\lambda_2$ is used for the upstream signal to transmit upstream data from the various broadband terminal adapters. As in the network 10 of FIG. 2a, in the network 10' of FIG. 2b, the upstream signal is terminated and regenerated at each broadband terminal adapter 18 and the optical protection switches 20 are utilized to maintain continuity of the bus structure 25 in the event of a failure of one of the nodes 13. Thus, in the network 10' of FIG. 2b an optical fiber is eliminated with the penalty of requiring wavelength division multiplexer/demultiplexer components (not shown) to enable utilization of two wavelengths on a single bus structure 25.

As indicated above, the customer premises network 10 of FIG. 2a preferably utilizes the Asynchronous Transfer Mode (ATM) to transmit downstream data to the customer premises equipment 12 and to transmit upstream data from the customer premise equipment 12. Illustratively, the upstream bus 16 utilizes an optical signal format know as the OC-3 to transmit the upstream data and the downstream bus utilizes an optical signal formal known as the OC-12 signal to broadcast the downstream data. It is particularly desirable to use the OC-12 and OC-3 signals in the customer premises network since these signals are also utilized in the B-ISDN.

Figure 3:
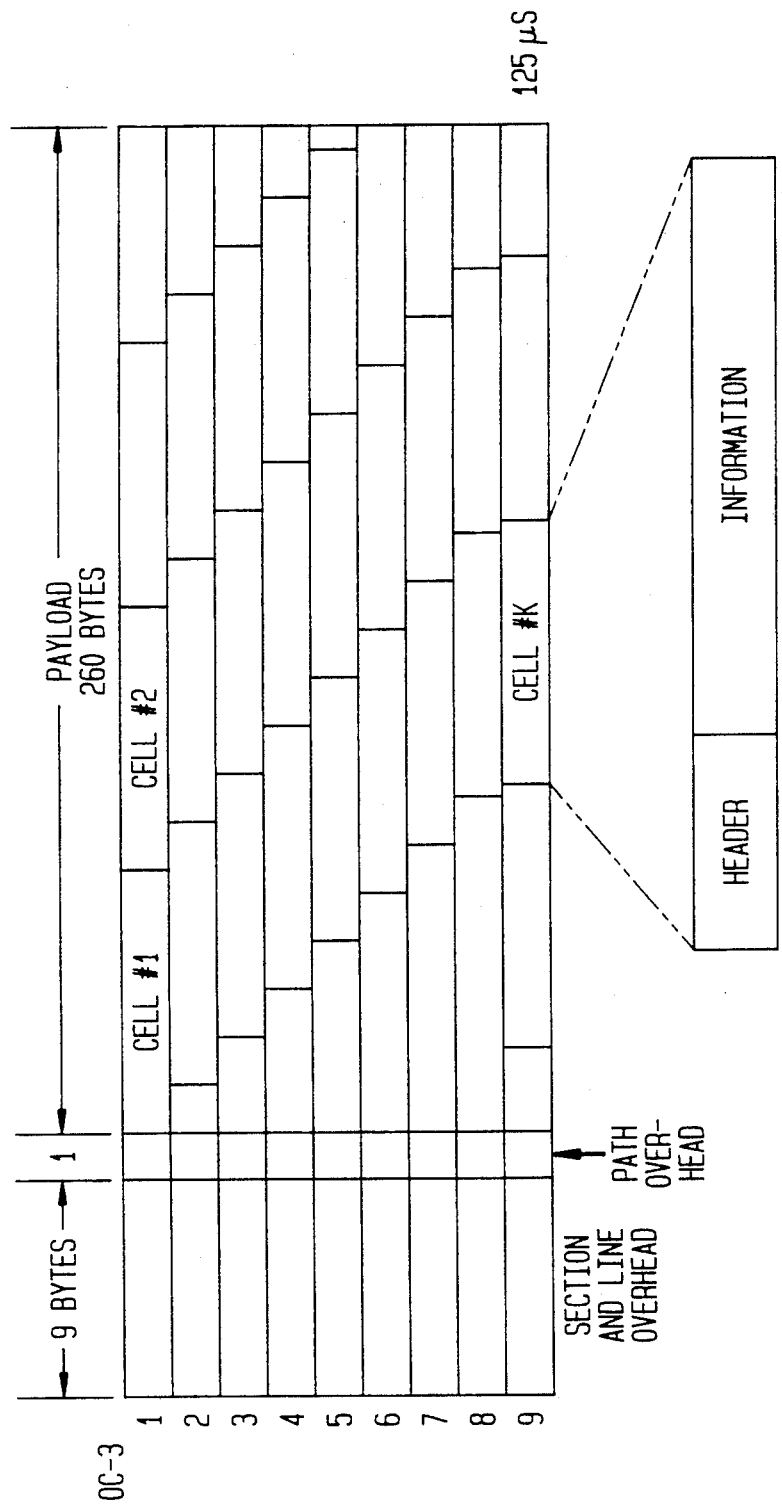
FIG. 3 schematically illustrates a signal format for transmitting data using the Asynchronous Transfer Mode.

An OC-3 signal which utilizes the Asynchronous Transfer Mode format is shown in FIG. 3. The OC-3 signal is a 155.52 Megabits/sec signal which is organized into 125 msec frames, with one such frame being illustrated in FIG. 3. In FIG. 3, the OC-3 frame is shown as being divided into 9 blocks (or lines) with the blocks being transmitted serially. Each line includes part of the frame overhead and part of a payload envelope. In particular each line includes 9 section and line overhead bytes, 1 path overhead byte, and 260 payload bytes. The overhead bytes are used for operation administration and maintenance, at the section, line, and path layers in a broadband digital trunk and exchange network such as the B-ISDN.

To use the OC-3 frame structure for the ATM transmission technique, the frame payload envelope is divided into packetized data units called cells. Illustratively, each OC-3 frame contains 34 cells. Each cell contains a header field and an information field. The cell header contains routing information for the cell and the information field contains data which is to be delivered to a particular unit of customer premises equipment. The transmission technique is called the asynchronous transfer mode because the individual cells are not synchronously reserved for particular services, but instead individual cells are occupied dynamically by particular services based on availability of cells and demand for transmission capacity by particular services. When the OC-3 signal is converted to electronic form, it is known as the STS-3c signal.

The OC-12 signal used on the downstream bus 14 of the customer premises network 10 comprises four OC-3 signals which are byte interleaved. Thus, the OC-12 signal has a bit rate of 622.08 Megabits/sec which is four times the bit rate of the OC-3 signal. When converted from optical to electronic form, the OC-12 signal is known as the STS-12 signal.

B. Optical Network Interface

Figure 4:
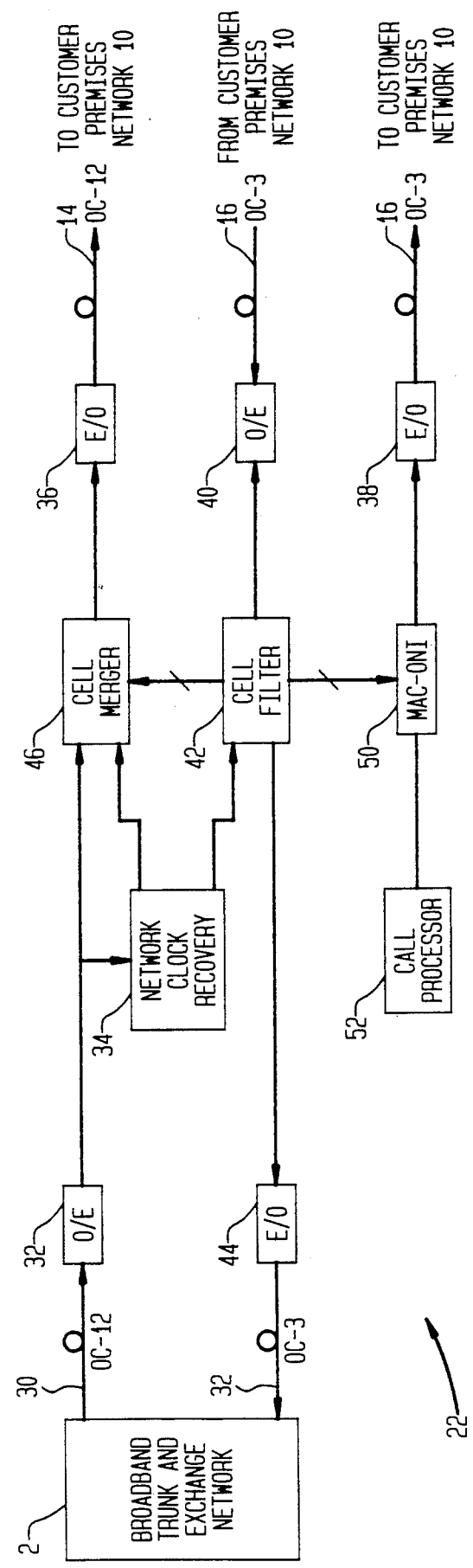

The optical network interface 22 of FIG. 2a is shown in greater detail in FIG. 4. Illustratively, an OC-12 signal arrives at the optical network interface 22 from the broadband trunk and exchange network 2 via an optical fiber 30. The OC-12 signal is converted from optical to electronic form by the optical/electronic converter 32 and its corresponding clock (622.08 MHz) is recovered by the network clock recovery circuit 34. The OC-3 clock (155.52 MHz) is easily obtained from the OC-12 clock by dividing by four so that no separate network clock recovery circuit is required for the OC-3 signal. The OC-12 signal leaves the optical network interface 22 on the bus 14 (see FIG. 2a) after being reconverted into optical form by the electronic/optical converter 36.

The OC-3 signal is the signal which propagates on the looped bus 16 (see FIG. 1a). An OC-3 signal whose payload envelopes comprise empty cells enters the bus 16 from the electronic/optical converter 38 and arrives back at the optical network interface 22 at the optical/electronic converter 40 after traversing the bus 16. The OC-3 signal arriving at the optical/electronic converter 40 comprises cells, at least some of which have picked up data from the customer premises equipment units 12 of FIG. 2a.

The cell filter 42 examines the cells in the OC-3 signal coming from the customer premises equipment and determines whether the data contained in each cell is to be routed back to the customer premises network 10 via bus 14, as would be the case for intercommunication between customer premises equipment 12, or is to be routed externally of the customer premises network 10 via the trunk and exchange network 2. Cells to be routed externally remain in the OC-3 signal and leave the optical network interface 22 via the electronic/optical converter 44 and the fiber 32, which fiber 32 is connected to the trunk and exchange network 2. Cells to be routed back to the customer premises network 10 are entered into the downstream OC-12 bit stream by the cell merger circuit 46. More particularly, cells for inter-customer premises unit communication arriving at the cell merger circuit 46 from cell filter circuit 42 are queued at the cell merger circuit 46 and inserted into empty cells of the OC-12 signal. Both the cell merger circuit 46 and cell filter circuit 42 receive timing information from the network clock recovery circuit 34. The cell filter circuit also sends information to a media access controller 50 (MAC-ONI) which performs an access protocol (discussed below in Section F) for the customer premises network. In addition, the optical network interface 22 includes the call processor 52 which handles call set up procedures.

C. Broadband Terminal Adapter

Figure 5:
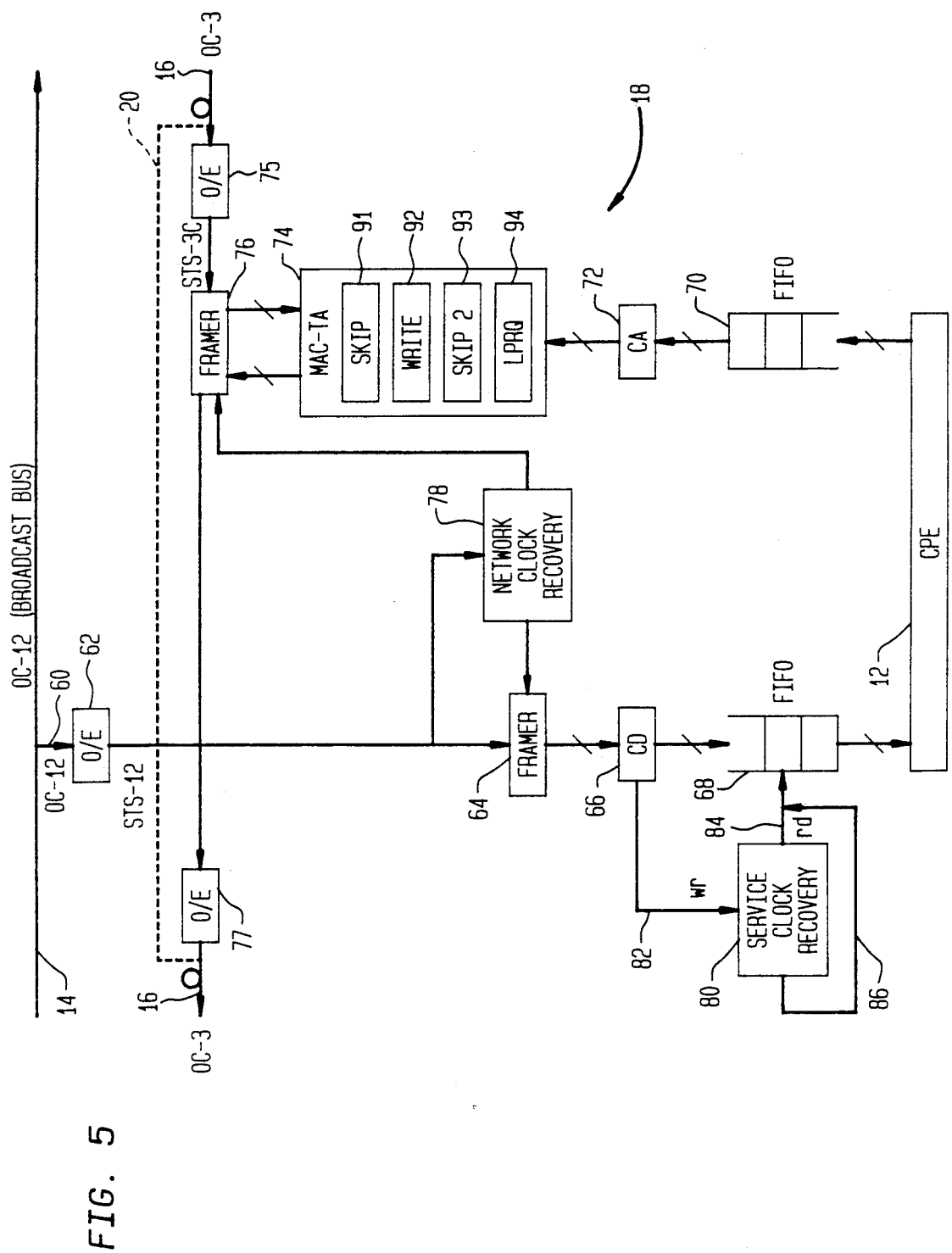

The broadband terminal adapter 18 of FIG. 2a is illustrated in more detail in FIG. 5. As shown in FIG. 2a, there is one such broadband terminal adapter 18 associated with each unit of customer premises equipment 12.

The downstream OC-12 signal is broadcast on the bus 14 to all of the broadband terminal adapters 18. As shown in FIG. 5, each broadband terminal adapter 18 has a fiberoptic tap 60 associated therewith, which tap enables the broadband terminal adapter to extract a fraction of the broadcast optical signal power propagating on the broadcast bus 14. The extracted signal is converted to electronic form by the optical/electronic converter 62. When converted to electronic form, the OC-12 signal is known as the STS-12c signal. By detecting frame synchronization bytes located in the frame overhead of the STS-12c signal, a framer circuit 64 is able to convert the STS-12c serial bit stream into parallel bytes and extract the payload envelope. The payload envelope of each STS-12c frame is processed by the cell disassembler circuit (CD) 66. The cell disassembler circuit 66 in each specific terminal adapter 18 extracts from the STS-12c signal those cells having an address in their header corresponding to the address of the specific unit of customer premises equipment 12 connected to the specific terminal adapter. The data from those cells having the appropriate address is stored in the First-In, First-Out (FIFO) buffer 68 which is connected to the unit of customer premises equipment 12. In this manner, data addressed to each specific unit of customer premises equipment 12 of FIG. 2a is extracted from the broadcast signal on the downstream bus 14.

The manner in which a unit of customer premises equipment 12 inserts data into the upstream signal propagating on the looped bus 16 is now considered. In particular, the signal propagating on the upstream loop 16 is an OC-3 signal, and each unit of customer premises equipment that wishes to transmit data via this signal must insert its data into empty cells of this signal. To accomplish this, information from a unit of customer premises equipment 12 which is connected to a broadband terminal adapter 18 is stored in the FIFO buffer 70 and packaged into cells with cell headers by the cell assembler circuit (CA) 71.

Because the broadband terminal adapters are interconnected by the bus 16 in a daisy chain (see FIG. 2a), the OC-3 signal transmitted by the bus 16 is terminated and regenerated at each broadband terminal adapter 18. Thus, in the broadband terminal adapter 18 of FIG. 5, the upstream optical OC-3 signal is terminated at the optical/electronic converter 75. When converted to electronic form, the OC-3 signal is known as the STS-3c signal. Following a protocol described below in Section F, the media access controller (MAC-TA) 74 and framer 76 insert data from the unit of customer premises equipment 12 into empty cells of the STS-3c signals. (A framer circuit for use in the Broadband Terminal Adapter 18 of FIG. 4 is disclosed in U.S. Pat. No. 4,819,226). In order to execute the access protocol the media access controller 74 maintains the SKIP counter 91, the WRITE counter 92, the SKIP2 counter 93 and the LPRQ counter 94. The STS-3c signal is then converted to optical form by the electronic/optical converter 77 to regenerate the OC-3 signal on the bus 16.

It should be noted that the framer circuits 64 and 76 of FIG. 5 receive timing information from a network clock recovery circuit 78 which recovers the basic network clock signal of the STS-12c signal and divides by four to obtain the clock signal of the STC-3C signal.

In FIG. 5, the optical protection switch 20 is represented by a phantom line. The reason for this is that the optical protection switch 20 is activated to bypass the terminal adapter 18 and maintain the continuity of the bus 16 only when the terminal adapter 18 or the associated unit of customer premises equipment 12 fails or is otherwise disconnected from the bus 16.

In addition to the network clock recovery circuit 78, the terminal adapter 18 of FIG. 5 contains a service clock recovery circuit 80. While the purpose of the network clock recovery circuit 78 is to recover the clocks of the synchronous OC-12 and OC-3 signals, the purpose of the service clock recovery circuit 80 is to recover the clock of a specific service being transmitted to a specific unit of customer premises equipment 12 from the asynchronously arriving cells containing data for the specific service. The service clock recovery circuit 80 is described below in section E.

D. Optical Protection Switch

Figure 6:
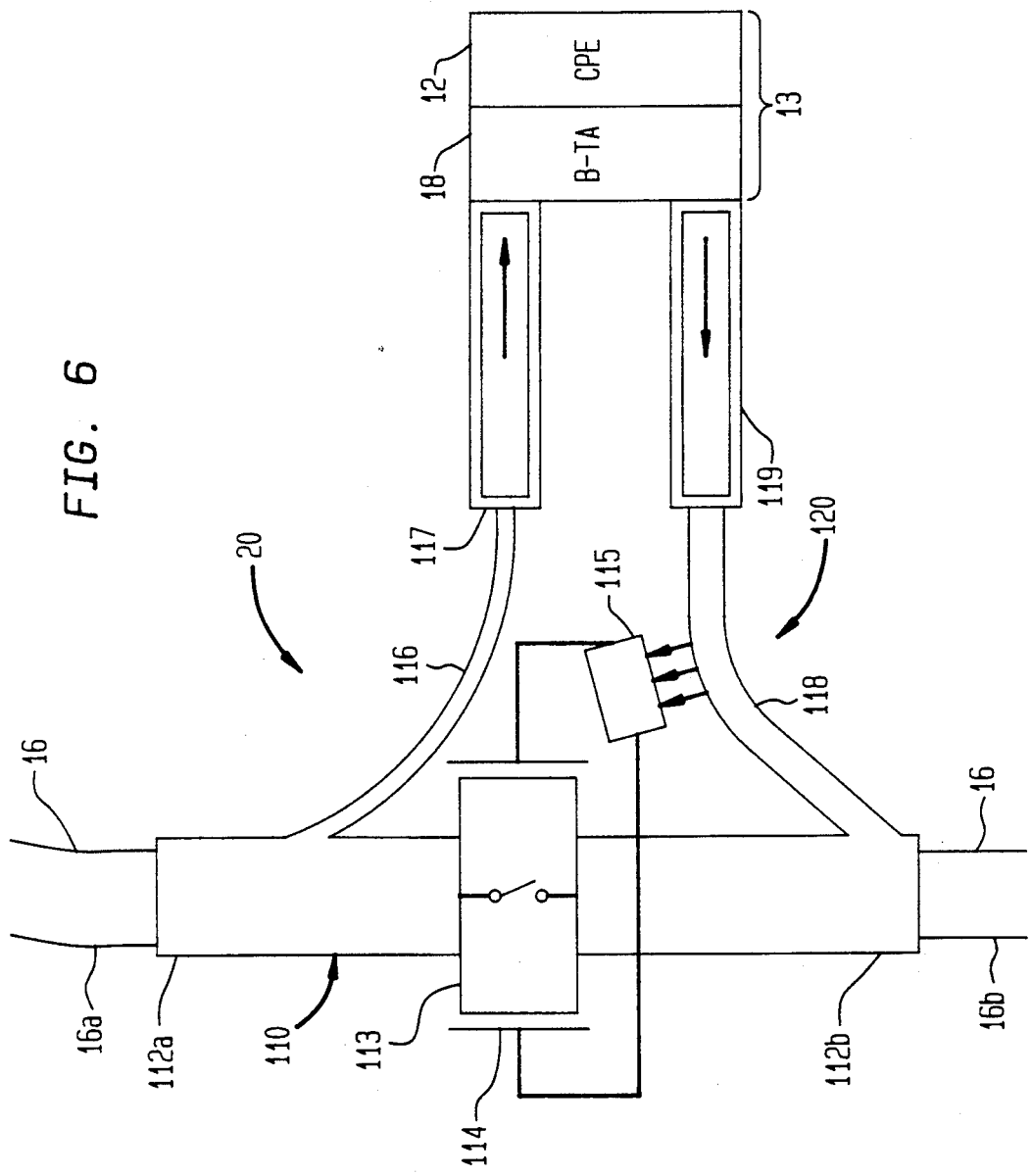

The optical protection switch 20 of FIGS. 2a, 2b, and 5, is illustrated in greater detail in FIG. 6. As indicated above, the optical protection switch 20 associated with each node 13 of the network 10 of FIG. 2a maintains the continuity of the upstream bus 16 in the event the node 13 fails or is disconnected (see, e.g., U.S. Pat. No. 4,406,513). As shown in FIG. 6, the optical protection switch 20 is inserted into the fiber bus 16 between two optical fiber ends designated 16a, which is the end via which optical signals enter the optical protection switch 20, and 16b, which is the end via which optical signals leave the optical protection switch 20. The optical protection switch 20 includes two paths 110 and 120 between the optical fiber ends 16a and 16b. The path 110 includes the planar waveguide portions 112a and 112b and the liquid crystal switch 113. The path 120 includes the taps 116 and 118, and the terminal connectors 117, 119. A node 13, which comprises the broadband terminal adapter 18 and customer premises equipment 12, is attached to the optical protection switch 20 via the terminal connectors 117, 119. In particular, the terminal connectors 117, 119 mate with opposing connectors (not shown) attached to optical fibers leading into and out of the node 13.

When a properly functioning node is attached to the optical protection switch 20 via the terminal connectors 117, 119, the optical protection switch operates so that the optical signal follows the path 120 and the path 110 is blocking. More particularly, an optical signal, such as an OC-3 signal propagating in the upstream bus 16, arrives at the optical protection switch 20 via fiber end 16a and propagates along the waveguide portion 112a. Since the path 110 is blocking, the signal propagates along the tap 116 and enters the node 13 via connector terminal 117. In the node 13, the signal is converted from optical to electronic form (using for example the optical/electronic converter 74 of FIG. 5) and is processed (e.g. information from the customer premises equipment 12 may be added to empty cells). The signal is then converted back to optical form 13 (using for example the electronic/optical converter 77 of FIG. 5). The signal, now in optical form, re-enters the optical protection switch 20 via the terminal connector 119. The regenerated signal then propagates along the tap 118 and the waveguide portion 112b, and leaves the optical protection switch 20 via the fiber end 16b.

Photogenerator array 115, which illustratively comprises a series-connected string of PIN diodes, senses the presence of an optical signal propagating in the re-entry tap 118. The photogenerator array 115 generates a voltage for the control electrodes 114 of the liquid crystal switch 113, thereby maintaining that switch in its non-transparent or blocking state. Thus the switch 113 is in its blocking state only if photogenerator array 115 is generating a control voltage. The generation of such a control voltage is dependent on the presence of an optical signal propagating in re-entry tap 118, a situation that can occur only if properly functioning node equipment 13 is attached to the optical protection switch 20.

If there is no optical signal in the re-entry tap 118, photogenerator array 115 will produce no control voltage and liquid crystal planar switch 113 will remain in its transparent state, by-passing taps 116 and 118 and any devices attached to them.

If the taps 116, 118 originally had properly functioning node or terminal equipment attached thereto, and this equipment failed, then photogenerator array 115 would cease to supply the needed control voltage to control electrodes 114 of the optical planar switch 113 and that switch would revert to its transparent state, by-passing the failed equipment and automatically "healing" the "injured" bus 16.

Similarly, if nothing is connected to the optical protection switch 20, for example, if the switch 20 has been installed in anticipation of future node requirements, but no node equipment has yet been installed, the switch 20 acts as an optical feed-through connector. In this case as well, there is no optical signal in tap 118 and no control voltage applied to the liquid crystal switch 113 so that the liquid crystal switch 113 is in its transparent state and the path 110 by-passes the open path 120.

In short, when utilized in the customer premises network, the optical protection switch 20 increases both the reliability of the network in the event of a node failure and the flexibility of the network in that node equipment can be disconnected or added without reconfiguring the entire network.

E. Service Clock Recovery Circuit

The service clock recovery circuit 80 of FIG. 5 is discussed below in connection with FIGS. 7a, 7b and 7c.

Conventional clock recovery techniques make use of regularly incoming data which has embedded within it timing information that is perfectly synchronized with a master clock generator. Services with information rates different from the master clock are adjusted to the master clock rate by adding bits containing no user information. This procedure is called "bit-stuffing". Timing information is extracted from these conventional signals using a conventional phase locked loop. However, in a network which utilizes ATM, information associated with specific services is bursty and may not arrive at predetermined times. Accordingly, conventional clock recovery circuits are not adequate to recover service clock signals in the customer premises network 10. For this reason, the unique service clock recovery circuit 80 of FIG. 5 is utilized.

As shown in FIG. 5, one input signal to the service clock recovery circuit 80 is the wr signal on line 82. The wr signal is generated by the cell disassembler circuit 66. The wr signal comprises a chain of pulses with one pulse being generated each time a byte of data is transferred by the cell disassembler 66 to the FIFO buffer 68. The output signal of the service clock recovery circuit is the rd signal on line 84. The rd signal is fed back to an input of the service clock recovery circuit 80 via line 86. The rd signal controls the transmission of data bytes from the FIFO 68 of FIG. 5 to the customer premises equipment 12. In particular, there is one rd pulse for each byte of data to be transferred from the FIFO 68 to the customer premises equipment 12. Thus, the rd signal corresponds to the recovered service clock.

As shown in FIG. 7a, the service clock recovery circuit 80 comprises a digital phase detector 150, a filter 160, and a voltage controlled oscillator 180. The inputs to the phase detector 150 are the wr and rd signals. The phase detector 150 generates output signals based on the difference between the number of data bytes transmitted from the cell disassembler 66 of FIG. 5 to the FIFO 68 and the number of bytes transmitted from the FIFO 68 to the customer premises equipment 12. The output signals of the phase detector 150 drive the filter 160 which in turn drives the voltage controlled oscillator 180. The output of the voltage controlled oscillator is the rd signal, which as indicated above controls the transfer of data bytes from the FIFO 68 to the customer premises equipment 12.

An illustrative embodiment of the digital phase detector 150 is shown in FIG. 7b. In FIG. 7b, the divide-by-N counter 171 (where $N=2^n$ is the capacity of the FIFO 68) counts the pulses of the wr signal on line 82 so as to count the number of bytes written into the FIFO 68 of FIG. 5. The outputs of the counter 171 are $a_{n-1} \ldots a_0$ and carry signal.

The divide-by-N counter 172 counts the pulses of the rd signal on line 86 so as to count the number of bytes transferred out of the FIFO 68 of FIG. 5. The outputs of the counter 172 are $b_{n-1} \ldots b_0$ and a carry signal.

The carry generation circuit 173 receives the carry signals from the two counters 171 and 172 and generate the most significant bit $a_n$ of the count of wr pulses and the most significant bit $b_n$ of the count of rd pulses.

In FIG. 7b, the values $a_n \ldots a_0$ are designated as A and the values $b_n \ldots b_0$ are designated as B. The subtractor circuit 174 subtracts B from A. The difference $A-B$ indicates the current occupancy of the FIFO 68. Based on the "borrow" output and the two most significant bits, $d_n$ and $d_{n-1}$, of the subtractor output, the occupancy range of the FIFO 68 is determined by the decision circuit 175 according to the following table:

| borrow | $d_n$ | $d_{n-1}$ | FIFO | occupancy (O) | up | down | action |
|---|---|---|---|---|---|---|---|
| 0 | 0 | 0 | | $0 < \frac{1}{4}$ | 0 | 1 | slow down frequency |
| 0 | 0 | 1 | $\frac{1}{4} \leq$ | $0 < \frac{1}{2}$ | 0 | 0 | no change |
| 0 | 1 | 0 | $\frac{1}{2} \leq$ | $0 < \frac{3}{4}$ | 0 | 0 | no change |
| 0 | 1 | 1 | | $0 \leq \frac{3}{4}$ | 1 | 0 | speed up frequency |
| 1 | X | X | | $0 < \frac{1}{4}$ | 0 | 1 | slow down frequency |

Illustratively, the decision circuit 175 is a finite state machine.

The output signals of the decision circuit 175 are "up" and "down" signals. The "up" and "down" signals are applied to the filter 160 of FIG. 7a and serve to increase and decrease, respectively, the rate of the rd signal. As shown in the foregoing table, if the FIFO is less than ¼ filled, the "down" signal is asserted to decrease the frequency of the rd signal until the FIFO is half filled. If the FIFO is more than ¾ filled, the "up" signal is asserted to increase the frequency of the rd signal until the FIFO occupancy is reduced to a half. A signal "hf" from the FIFO (or generated by an alternative phase detector described below) indicating when the FIFO is half filled is received at the decision circuit on line 176. If the FIFO occupancy is between ¼ and ¾, then no change is made to the frequency of the rd signal and the rd frequency tends to approach the service transmission frequency.

As indicated above, the "up" and "down" signals are transmitted to a filter 160 which in turn drives the voltage controlled oscillator 170. Illustratively, the filter converts the "up" and "down" signals into a single voltage which is then low-pass filtered so that the DC level and amplitude swing at the filter output maintains the output of the voltage controlled oscillator 170 within a predetermined range.

Figure 7C:
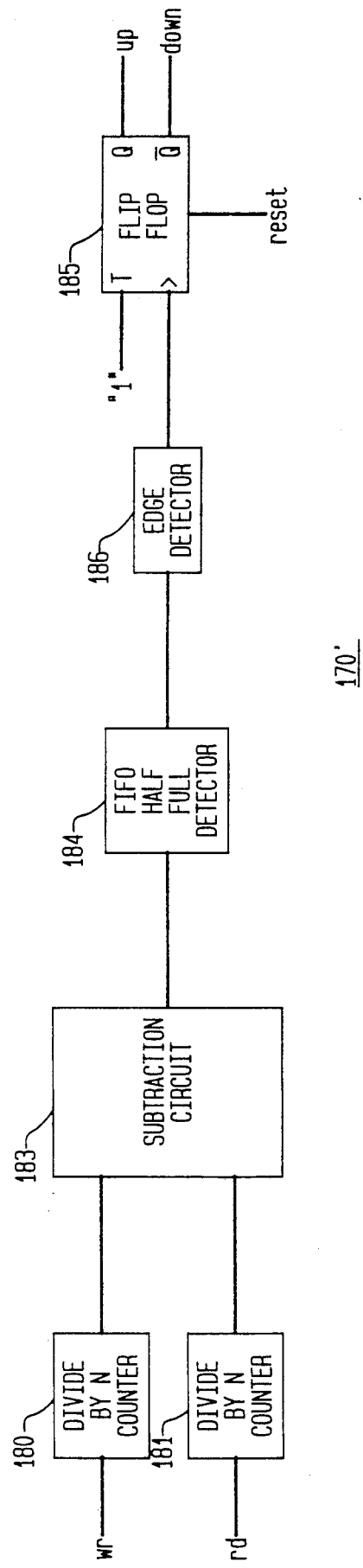

An alternative digital phase detector circuit for generating the "up" and "down" signals is shown in FIG. 7c. In the phase detector 170' of FIG. 7c the wr and rd signals are received in the divide-by-N counters 180 and 181 to count the number of bytes written into the FIFO 68 of FIG. 5 and to count the number of bytes transferred out of the FIFO 68. The current occupancy of the FIFO is obtained by subtracting the two counts using the subtractor circuit 183. The circuit 184 determines from the output of the subtractor circuit 184 whether the FIFO is less than or more than half full. The output of the circuit 184 is connected to an input of the flip-flop 185 via edge detector 186. The Q and Q outputs of the flip-flop 185 are the "up" and "down" signals respectively. When the FIFO is less than half full, the "up" signal is unasserted and the "down" signal is asserted. If the FIFO is more than half full, the opposite occurs.

The service clock recovery circuit described herein is highly advantageous in that it enables the recovery of a clock from a bursty as well as a smooth bit stream, it allows individual services to have clocks which are independent of a network clock, and it is easily integrated into a customer premises network.

Customer Premises Node Access Protocol

This section describes a protocol via which the units of customer premises equipment 12 (see FIG. 2a) can access the OC-3 bit stream transmitted on the upstream bus 16 so as to enter data into empty transmission cells of the OC-3 bit stream. In particular, the protocol serves to resolve contention among the units of customer premises equipment 12 for access to the cells of the OC-3 signal. The protocol is executed by the media access controller 74 in each terminal adapter 18 (see FIG. 5) and by the media access controller 50 of the optical network interface 22 (see FIG. 4).

The reason that the looped bus 16 requires a protocol for access by the nodes 13 may be understood as follows. Assume that each node 13 is allowed access to the bus 16 any time it has an information cell to send and it receives an empty OC-3 transmission cell from the immediately upstream terminal on the bus 16. In such an access scheme, the first (i.e., the most upstream) node can get access to all the OC-3 transmission cells, while the last (i.e., the most downstream) node can only access a fraction of the OC-3 transmission cells, because many of the transmission cells will have been occupied with data from preceding terminals. Therefore, this access mechanism is fundamentally unfair.

The protocol described herein overcomes this unfairness and provides more equitable access to the bus 16 for the nodes 13. The protocol of the present invention comprises two parts. The first part enables each node on the bus 16 to keep track of the requirements for cells made by nodes downstream of it. The second part relates to how the requirements for cells by the various nodes are carried out.

The mechanism for keeping track of cell requirements is considered first. In the protocol of the present invention, one byte of a cell header of the bit stream on the bus 16 is used to carry an access control field. The access control field illustratively comprises two request fields, named A-counter and E-counter, and a "busy" bit.

The use of these request fields is as follows. If the $k^{th}$ node has r new cells to transmit, the $k^{th}$ node will place the r requests into the A-counter of a cell, which r requests are cumulated with requests written into the A-counter by nodes upstream and downstream of the $k^{th}$ node. However, a node is not permitted to place requests into an A-counter if it has previously placed requests that have not yet been satisfied. The $k^{th}$ node will also record the total number of requests accumulated in the A-counter up to that point as the cell containing the A-counter departs.

The A-counter with the requests will propagate from node to node along the bus 16 and eventually reach the optical network interface 22 (see FIG. 2a and FIG. 4). By means of the cell filter 42 and media access controller 50, the total number of requests accumulated in the A-counter will be sent back on the bus 16 to the nodes 13 in an E-counter of a cell. The lapse between an arriving A-counter and the corresponding E-counter will be larger than or equal to L where L is the latency of the bus 16. By subtracting the recorded A-counter value from the E-counter value, each node can determine the number of requests made by nodes downstream of it. A terminal cannot write to a new A-counter until it has received an E-counter corresponding to the previously written A-counter.

Figure 8:
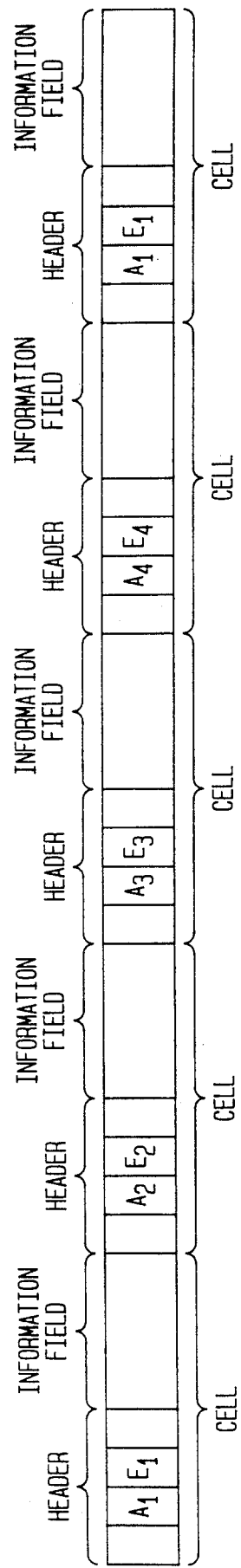
FIG. 8 schematically illustrates the cell format used by a particular access protocol for the customer premises network of FIGS. 2a and 2b.

To support multiple service priorities an A-counter and an E-counter are used for each priority class. More particularly, an A-counter and E-counter may be provided in each cell so that if there are m priority classes, the A-counter and E-counter for each priority class occurs every $m^{th}$ cell. Illustratively, m=4. A sequence of cells including the A-counter and E-counter for four priority classes is illustrated in FIG. 8. In FIG. 8, the A-counter for the $j^{th}$ priority class is designated $A_j$ and the E-counter for the $j^{th}$ priority class is designated $E_j$.

With multiple service priorities, downstream requests are kept track of by each node as follows. An A-counter for a specific priority class is initialized to zero by the optical network interface 22 and is sent out onto the bus 16. When a specific node of the specific priority class receives this A-counter, it must determine the number of its own requests to add to the contents of this A-counter. Illustratively, the rules for this are: if the node has any previously placed unsatisfied requests, no additional requests may be placed. Otherwise, as many requests may be placed as there are cells in the local buffer (e.g. buffer 70 of FIG. 5) up to a predetermined maximum. As the A-counter of the specific priority class is sent to the next downstream node on the bus 16, the specific node records in the media access controller of its terminal adapter the value accumulated in the A-counter of the specific priority class up to that point. The node also records the values of the A-counters of all other priority classes as these A-counter pass by on the bus 16.

When the A-counter reaches the optical network interface, the contents of the A-counter are transferred to an E-counter of the specific priority class and again sent out on the bus 16. Thus, the specific node can therefore determine the number of requests of its own specific priority placed downstream of it by subtracting the recorded value of the A-counter of the specific priority class from the corresponding E-counter of the specific priority class transmitted from the optical network interface 22. The time that elapses between an A-counter and a corresponding E-counter is equal to or larger than L cell time periods. By subtracting the recorded A-counter values of other priority classes from the E-counter of other priority classes, a node of a specific priority class can also keep track of requests of other priority classes made by nodes further downstream. Thus, a method has been provided for both the single and multiple priority cases to enable a node to keep track of requests made by nodes further downstream.

How and in what order the requests are handled are now considered. It is first assumed that only one priority class is active. To handle the requests, the media access controller (74 of FIG. 5) at each node maintains three counters. These are SKIP, WRITE, and SKIP2. The SKIP, WRITE, and SKIP2 counters are illustrated as part of media access controller 74 wherein these counters are designated 91, 92, and 93, respectively. The SKIP counter of a node contains the number of requests made downstream of the node. In the situation where only one priority class is active, the SKIP counter is incremented by the values obtained by subtracting the recorded value of the A-counter from the corresponding E-counter. As soon as the SKIP counter is not zero, the node enters the bypass mode. In the bypass mode, a node bypasses empty cells in the bit stream on the bus 16. The SKIP counter is decremented for every empty cell bypassed. The WRITE counter contains the number of outstanding requests placed by the node. The WRITE counter is decremented for every empty cell used by the node. In general, when there is only one active priority class, a node can write data into empty cells when its WRITE counter is not zero (i.e. it has unsatisfied requests) and its SKIP counter is zero (i.e. there are no downstream requests waiting to be satisfied). The third counter, SKIP2, is similar to the SKIP counter in that it is used to accumulate downstream requests. The difference between SKIP and SKIP2 is as follows. If the WRITE counter at a node is not zero, new downstream requests (as determined by subtracting a recorded A-counter value from a newly arriving E-counter value) are accumulated in SKIP2. If the node has no outstanding requests (i.e. if the WRITE counter is zero), these new downstream requests are accumulated in the SKIP counter. When both SKIP and WRITE become zero, the contents of SKIP2 are transferred to SKIP and SKIP2 is reset to zero. This mechanism prevents requests at a particular node from accumulating while downstream requests are satisfied.

In the protocol, the departure of a cell from a node may be announced or unannounced. A node is in an idle state when its buffer is empty (i.e. its WRITE counter is zero) and its SKIP counter is zero. Assume that the node just received an A-counter. Since its buffer is empty, no requests are made. Next assume the terminal receives four empty transmission cells in a row via the bus 16 with the last cell including the next A-counter. The first two cells are unused since the buffer is empty. Then three information cells arrive at the buffer of the node for transmission. The next two cells (i.e. the third and fourth of the four cells) arriving via the bus 16 are then used by the node. This can be done because the SKIP counter is zero. The departure of these two cells is unannounced because no request was ever placed for them. Since there is one information cell remaining in the buffer, one request will be made in A-counter of the fourth arriving cell. The departure of the last cell in the buffer is therefore announced since a request has been placed for it. This mechanism of allowing unannounced departures keeps the overall average delay down, while the presence of announced departures insures fairness among the nodes.

The handling of requests wherein multiple priority classes are present is now considered. At each node, higher priority requests placed by higher priority more downstream nodes and equal priority requests placed by more downstream nodes are added unconditionally to the SKIP counter either directly from an E-counter or from the SKIP2 counter. Lower priority requests placed by lower priority more downstream nodes are stored in a separate LPRQ counter (designated 94 in FIG. 5). When its LPRQ is greater than zero, a node cannot send its information cells unannounced. Instead it must place requests first. This is done to insure fairness within the lower priorities, since empty cells reaching a node could be meant for more downstream lower priority nodes. The LPRQ counter is decremented when SKIP and WRITE are both zero and an empty transmission cell is bypassed.

The operation of the protocol may be summarized as follows. In both a single priority and a multiple priority environment, each node keeps track of the requests made by nodes downstream of it and bypasses a sufficient number of empty cells so that its own requests and the requests made downstream of it achieve fair access to the bus.

When an optical premises network utilizes the above-described protocol several significant advantages results. First, all services can access the upstream transmission bit stream using this protocol so that it is not necessary for the nodes to execute different protocols for different services. In addition, the protocol resolves contention among nodes for access to the bus 16 on a fair basis.

CONCLUSION

An optical customer premises network for interfacing customer premises equipment with a public broadband digital trunk and exchange network has been disclosed. Illustratively, the customer premises network comprises a high bit rate optical broadcast bus for broadcasting downstream data to the customer premises equipment and a lower bit rate looped bus for transmitting upstream data from the customer premises equipment. An optical network interface is provided to connect the buses to the trunk and exchange network. Each unit of customer premises equipment is interfaced with the upstream and downstream buses by means of a broadband terminal adapter. The terminal adapters are interconnected in a daisy chain fashion by the upstream bus. An optical protection switch is utilized to insure the continuity of the upstream bus in the event of a failure or disconnection of a unit of customer premises equipment or its associated terminal adapter.

The upstream and downstream buses illustratively utilize the Asynchronous Transfer Mode (ATM) to transmit data from a plurality of services. Each terminal adapter includes a unique service clock recovery circuit to enable the recovery of a clock of a particular service whose asynchronously transmitted data is embedded in the ATM bit stream.

In addition, to insure all units of customer premises equipment fair access to the upstream bus, a unique protocol capable of handling services with multiple priorities has been disclosed.

Finally, the above-described embodiments of the invention are intended to be illustrative only. Numerous alternative embodiments may be devised by those skilled in the art without departing from the spirit and scope of the following claims.

What is claimed is:

1. An optical customer premises network for interconnecting a plurality of units of customer premises equipment to a broadband digital trunk and exchange network, said optical premises network comprising:

first transmission means for optically broadcasting downstream information to said units of customer premises equipment using the Asynchronous Transfer Mode information transfer protocol, second transmission means sequentially connecting said units of customer premises equipment for optically transmitting upstream information from said units of customer premises equipment using the Asynchronous Transfer Mode information transfer protocol, an optical network interface connecting said first and second transmission means from said optical customer premise network to said broadband digital trunk and exchange network, first means included in said optical network interface for receiving information encoded into an Asynchronous Transfer Mode bit stream from said broadband trunk and exchange network, transferring said information to said first transmission means to optically broadcast said information to all of said customer premises equipment, second means included in said optical network interface for receiving upstream information from customer premises equipment via said second transmission means and transferring said information to said Asynchronous Transfer Mode bit stream of said broadband trunk and exchange network, and third means included in said optical network interface for transferring said information from said second transmission means to said first transmission means for communication between particular units of said customer premises equipment.

2. The optical customer premises network of claim 1 wherein said first transmission means has a larger bandwidth than said second transmission means.

3. The optical customer premises network of claim 1 wherein said first transmission means comprises an optical fiber broadcast bus.

4. The optical customer premises network of claim 3 wherein said second transmission means comprises a looped optical fiber bus which interconnects said units of customer premises equipment to form a daisy chain.

5. The optical premises network of claim 4 wherein each of said units of customer premises equipment is connected to said downstream broadcast bus and said upstream looped bus by an associated terminal adapter, each of said terminal adapters comprising means for filtering particular information destined for the associated unit of customer premises equipment from a bit stream transmitted via the broadcast bus, and means for writing particular information from the associated unit of customer premises equipment into a bit stream transmitted via said looped bus.

6. The optical customer premises network of claim 1 wherein a high bit rate Asynchronous Transfer Mode bit stream is transmitted downstream to said units of customer premises equipment via said first transmission means and wherein a low bit rate Asynchronous Transfer Mode bit stream is transmitted upstream from said units of customer premises equipment via said second transmission means.

7. The customer premises network of claim 1 wherein said first and second transmission means comprise first and second distinct optical bus structures, respectively.

8. An optical customer premises network for interconnecting a plurality of units of customer premises equipment to a broadband digital trunk and exchange network, said optical premises network comprising:

first transmission means comprising an optical fiber broadcast bus for optically broadcasting downstream information to said units of customer premises equipment, and second transmission means comprising a looped optical fiber bus which interconnects said units of customer premises equipment to form a daisy chain for optically transmitting upstream information from said units of customer premises equipment, wherein a high bit rate Asynchronous Transfer Mode bit stream is transmitted downstream to said units of customer premises equipment via said broadcast bus and wherein a low bit rate Asynchronous Transfer Mode bit stream is transmitted upstream from said units of customer premises equipment via said looped bus, and wherein said broadcast bus and said looped bus are connected to an optical network interface located in between said customer premises network and said broadband digital trunk and exchange network, said optical network interface comprising, means for receiving said high bit rate Asynchronous Transfer Mode bit stream from said trunk and exchange network and for applying said high bit rate Asynchronous Transfer Mode bit stream to said broadcast bus of said customer premises network, means for receiving said low bit rate Asynchronous Transfer Mode bit stream from said looped bus of said customer premises network and for applying said low bit rate Asynchronous Transfer Mode bit stream to said trunk and exchange network, and means for transferring information from said low bit rate stream to said high bit rate stream for communication between particular ones of said units of customer premise equipment.

9. An optical customer premises network for interconnecting a plurality of units of customer premises equipment to a broadband digital trunk and exchange network, said optical premises network comprising:

first transmission means comprising an optical fiber broadcast bus for optically broadcasting downstream information to said units of customer premises equipment, second transmission means comprising a looped optical fiber bus which interconnects said units of customer premises equipment to form a daisy chain for optically transmitting upstream information from said units of customer premises equipment, each unit of customer premises equipment forming part of a node located on said looped bus, and an optical protection switch associated with each of said nodes to preserve the optical continuity of the looped bus in the event of failure of disconnection of one of said nodes, said optical protection switch comprising a first path for an optical signal propagating on said looped bus, said first path including one of said nodes, photodetector means for detecting the presence of said optical signal in said first path, and a second path for said optical signal propagating on said looped bus, said second path including optical switch means responsive to said photodetector means, said switch means serving to allow optical propagation in said second path when said photodetector means does not detect said signal in said first path and block said second path when said photodetector means detects said signal in said first path.

10. The customer premises network of claim 9 wherein said switch means is a liquid crystal switch.

11. An optical customer premises network for interconnecting a plurality of units of customer premises equipment to a broadband digital trunk and exchange network, said optical premises network comprising:

first transmission means for optically broadcasting downstream information to said units of customer premises equipment, and second transmission means sequentially connecting said units of customer premises equipment for optically transmitting upstream information from said units of customer premises equipment, wherein said first and second transmission means together comprise a single bus structure which utilizes a first optical wavelength to transmit said downstream information and a second optical wavelength to transmit said upstream information.

* * * * *